(12) United States Patent
Zhu et al.

(10) Patent No.: US 12,504,644 B2
(45) Date of Patent: Dec. 23, 2025

(54) 3D INTEGRATED IMAGING DEVICES AND PREPARATION METHODS THEREOF

(71) Applicant: SVG TECH GROUP CO., LTD., Jiangsu (CN)

(72) Inventors: Ming Zhu, Suzhou (CN); Ying Yang, Suzhou (CN); Guoyong Zhang, Suzhou (CN); Shunda Xu, Suzhou (CN); Renjin Shao, Suzhou (CN); Donglin Pu, Suzhou (CN); Xiaoning Liu, Suzhou (CN)

(73) Assignee: SVG TECH GROUP CO., LTD., Suzhou (CN)

( * ) Notice: Subject to any disclaimer, the term of this patent is extended or adjusted under 35 U.S.C. 154(b) by 0 days.

(21) Appl. No.: 19/273,214

(22) Filed: Jul. 18, 2025

(65) Prior Publication Data

US 2025/0347925 A1 Nov. 13, 2025

Related U.S. Application Data

(63) Continuation of application No. PCT/CN2023/136336, filed on Dec. 5, 2023.

(30) Foreign Application Priority Data

Feb. 7, 2023 (CN) .......................... 202310085843.5

(51) Int. Cl.
*G02B 30/36* (2020.01)
*H04N 23/958* (2023.01)

(52) U.S. Cl.
CPC ........... *G02B 30/36* (2020.01); *H04N 23/958* (2023.01)

(58) Field of Classification Search
CPC .............................. G02B 30/36; H04N 23/958
(Continued)

(56) References Cited

U.S. PATENT DOCUMENTS

| 2012/0182403 A1 | 7/2012 | Lange |
| 2020/0021797 A1 | 1/2020 | Liu et al. |
| 2022/0321857 A1 | 10/2022 | Zhang et al. |

FOREIGN PATENT DOCUMENTS

| CN | 1218978 A | 6/1999 |
| CN | 101850680 A | 10/2010 |

(Continued)

OTHER PUBLICATIONS

International Search Report in PCT/CN2023/136336 mailed on Apr. 1, 2024, 7 pages.
(Continued)

*Primary Examiner* — Bumsuk Won
*Assistant Examiner* — Mitchell T Oestreich
(74) *Attorney, Agent, or Firm* — PORUS IP LLC

(57) ABSTRACT

The present disclosure relates to a 3D integrated imaging device and a preparation method thereof. The 3D integrated imaging device includes a spacer layer, a three-dimensional structure layer, and a microlens array. The spacer layer has a preset thickness. The three-dimensional structure layer is disposed on a surface of a side of the spacer layer and includes a plurality of micro-nano structure units. The microlens array is arranged on a surface of a side of the spacer layer away from the three-dimensional structure layer and includes a plurality of microlenses. The plurality of micro-nano structure units correspond to the plurality of micro-lenses one by one. A front view pattern of the plurality of micro-nano structure units is a superposition of images formed by each layered image of a target stereoscopic image under the plurality of micro-lenses according to different depths of field after the target stereoscopic image is layered.

11 Claims, 9 Drawing Sheets

(58) Field of Classification Search
USPC .......................................................... 359/466
See application file for complete search history.

(56) References Cited

FOREIGN PATENT DOCUMENTS

| | | | |
|---|---|---|---|
| CN | 103236222 A | * | 8/2013 |
| CN | 104063843 A | | 9/2014 |
| CN | 104834029 A | | 8/2015 |
| CN | 104898290 A | | 9/2015 |
| CN | 205280964 U | | 6/2016 |
| CN | 206804900 U | | 12/2017 |
| CN | 108572462 A | | 9/2018 |
| CN | 219609983 U | | 8/2023 |
| JP | 2018129682 A | | 8/2018 |
| WO | 2017005204 A1 | | 1/2017 |

OTHER PUBLICATIONS

Written Opinion in PCT/CN2023/136336 mailed on Apr. 1, 2024, 9 pages.
Xing, Yan et al., 3D information acquisition technology of integral imaging, Infrared and Laser Engineering, 49(3): 0303003-1-0303003-12, 2020.

* cited by examiner

3D INTEGRATED IMAGING DEVICES AND PREPARATION METHODS THEREOF

CROSS-REFERENCE TO RELATED APPLICATIONS

This application is a continuation of International Patent Application No. PCT/CN2023/136336, filed on Dec. 5, 2023, which claims priority to Chinese Patent Application No. 202310085843.5, filed on Feb. 7, 2023, the entire contents of each of which are incorporated herein by reference.

TECHNICAL FIELD

The present disclosure relates to the field of printing technology, and in particular, relates to 3D integrated imaging devices and preparation methods thereof.

BACKGROUND

Since there is a certain distance between human eyes, each eye forms a distinct angle with the observed object, resulting in a slight difference between the images perceived by the left and right eyes, resulting in parallax. This parallax is processed by the brain to generate spatial stereoscopic perception. The 3D naked-eye display effect based on microlens arrays is the result of the combined effect of the optical effect between the microlens array and micro-image array, along with the binocular vision of the human eye. When the microlens array is superimposed with the micro-image array, observers can directly perceive 3D images with the naked eye via the binocular parallax principle. However, currently, when performing 3D naked-eye display based on microlens arrays, the display effect of the reproduced image is average.

Therefore, it is necessary to provide 3D integrated imaging devices and preparation methods thereof to enhance the display effect of the reproduced image.

SUMMARY

One or more embodiments of the present disclosure provide a 3D integrated imaging device. The 3D integrated imaging device includes a spacer layer, a three-dimensional structure layer, and a microlens array. The spacer layer has a preset thickness. The three-dimensional structure layer is disposed on a surface of a side of the spacer layer, and the three-dimensional structure layer includes a plurality of micro-nano structure units. The microlens array is arranged on a surface of a side of the spacer layer away from the three-dimensional structure layer. The microlens array includes a plurality of microlenses. The plurality of micro-nano structure units correspond to the plurality of microlenses one by one. A front view pattern of the plurality of micro-nano structure units is a superposition of images formed by each layered image of a target stereoscopic image under the plurality of microlenses according to different depths of field after the target stereoscopic image is layered. A relationship between pixel coordinates of each layered image of the target stereoscopic image under a single microlens in a three-dimensional coordinate system and pixel coordinates in the three-dimensional structure layer is:

$$X = X0 + \tan\left(\sin^{-1}\left(\sin\left(\tan^{-1}\left(\frac{x-x0}{g}\right)\right) * n\right)\right) * d,$$

$$Y = Y0 + \tan\left(\sin^{-1}\left(\sin\left(\tan^{-1}\left(\frac{y-y0}{g}\right)\right) * n\right)\right) * d,$$

where (X, Y) refers to the pixel coordinates of the layered image of the target stereoscopic image in the three-dimensional coordinate system, (X0, Y0) refers to a central coordinate of the microlens, (x, y) refers to coordinates of pixel points on a micro-nano structure unit corresponding to the microlens, (x0, y0) refers to a central coordinate of the micro-nano structure unit, n is a refractive index of the microlens, g is a sum of a thickness of the spacer layer and a height of the microlens, and d is a depth of field, that is, a distance from a plane where the layered image is located to a vertex of the microlens.

In some embodiments, the spacer layer is made of a light-transmitting material, and the material of the spacer layer is the same as a material of the microlens array.

In some embodiments, a reflective material layer is provided on a side of the microlens array away from the spacer layer.

In some embodiments, a sum of the thickness of the spacer layer and a thickness of the microlens array is greater than a focal length of each microlens.

In some embodiments, the preset thickness is 1 micron to 200 microns.

In some embodiments, the microlens array comprises plano-convex lenses arranged in an array, and the arrangement of the array comprises an orthogonal arrangement or a honeycomb arrangement.

One or more embodiments of the present disclosure provide a preparation method for a 3D integrated imaging device. The 3D integrated imaging device includes a spacer layer, a three-dimensional structure layer, and a microlens array. The spacer layer has a preset thickness. The three-dimensional structure layer is disposed on a surface of a side of the spacer layer, and the three-dimensional structure layer includes a plurality of micro-nano structure units. The microlens array is arranged on a surface of a side of the spacer layer away from the three-dimensional structure layer, and the microlens array includes a plurality of micro-lenses. The plurality of micro-nano structure units correspond to the plurality of micro-lenses one by one. A front view pattern of the plurality of micro-nano structure units is a superposition of images formed by each layered image of a target stereoscopic image under the plurality of microlenses according to different depths of field after the target stereoscopic image is layered. The preparation method includes simulating to form a three-dimensional coordinate system; converting pixel coordinates of a three-dimensional target object in the three-dimensional coordinate system into pixel coordinates on a recording plane; forming the three-dimensional structure layer on a surface of a side of a substrate based on the pixel coordinates on the recording plane; disposing the spacer layer on a surface of the three-dimensional structure layer away from the substrate; and disposing the microlens array on a surface of a side of the spacer layer away from the three-dimensional structure layer.

In some embodiments, the converting pixel coordinates of a three-dimensional target object in the three-dimensional coordinate system into pixel coordinates on a recording plane includes: layering the three-dimensional target object to form a plurality of planar object images; setting different depths of field for different planar object images among the plurality of planar object images; and converting pixel coordinates of the plurality of planar object images in the three-dimensional coordinate system into the pixel coordinates on the recording plane based on the depths of field of the plurality of planar object images and parameters of the microlens array.

In some embodiments, the setting different depths of field for different plane images among the plurality of plane images includes: calculating reference values of the depths of field, the reference values being expressed by:

$$d_0 = \frac{P_1}{P_p} kf = knf,$$

where $d_0$ refers to the reference values, $P_1$ refers to a period between the plurality of microlenses, f refers to a focal length of the plurality of microlenses, $P_p$ refers to a resolution of pixel points on the recording plane, and n refers to a number of pixels in the plurality of microlenses. After the converting pixel coordinates of a three-dimensional target object in the three-dimensional coordinate system into pixel coordinates on a recording plane, the preparation method further includes: adjusting the pixel coordinates on the recording plane by a following mapping relationship:

$$\begin{pmatrix} i' \\ j' \\ s' \\ t' \end{pmatrix} = \begin{pmatrix} 1 & 0 & -k & 0 \\ 0 & 1 & 0 & -k \\ 0 & 0 & -1 & 0 \\ 0 & 0 & 0 & -1 \end{pmatrix} \begin{pmatrix} i \\ j \\ s \\ t \end{pmatrix} + \begin{pmatrix} kn \\ kn \\ n+1 \\ n+1 \end{pmatrix},$$

where $$\begin{pmatrix} i' \\ j' \\ s' \\ t' \end{pmatrix}$$

refers to coordinates, after adjustment, of (s', t')th pixel point in the recording plane corresponding to (s', j')th microlens, $$\begin{pmatrix} i \\ j \\ s \\ t \end{pmatrix}$$

refers to coordinates, before adjustment, of (s, t)th pixel point in the recording plane corresponding to (i, j)th microlens, k refers to a constant, and n refers to a number of pixels corresponding to a single microlens.

In some embodiments, the forming the three-dimensional structure layer on a surface of a side of a substrate based on the pixel coordinates on the recording plane includes: forming the plurality of micro-nano structure units on the surface of the side of the substrate based on the pixel coordinates on the recording plane; and filling the surface of the side of the substrate with a coloring material.

In some embodiments, after the forming the three-dimensional structure layer on a surface of a side of a substrate based on the pixel coordinates on the recording plane, the preparation method further comprises peeling off the substrate.

In the preparation method for a 3D integrated imaging device provided according to some embodiments of the present disclosure, first simulating to form the three-dimensional coordinate system, then converting pixel coordinates of the three-dimensional target object need to be reproduced in the three-dimensional coordinate system into pixel coordinates on the recording plane, further forming the three-dimensional structure layer with a three-dimensional pattern having light-dark contrast on the surface of the side of the substrate based on the pixel coordinates on the recording plane, further sequentially disposing the spacer layer and the microlens array on the three-dimensional structure layer, through the coordination of the three-dimensional structure layer and the microlens array, a 3D image can be observed at the corresponding observation position. By controlling the thickness of the spacer layer, the distance between the vertex of the microlens array and the three-dimensional structure layer can be controlled, thereby enabling control of the depth of field in the reproduced image, which has the function of adjusting the depth of field effect of the reproduced image.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

Figure 1:
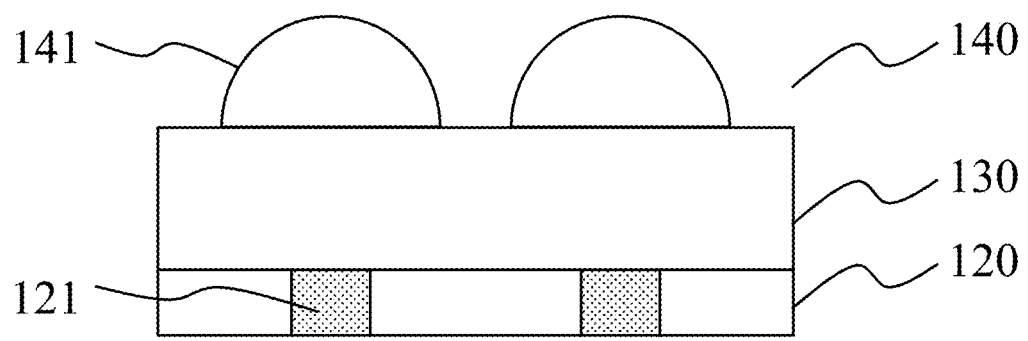
FIG. 1 is a schematic diagram illustrating a structure of an exemplary 3D integrated imaging device according to some embodiments of the present disclosure.

Reference numerals: 100, 3D integrated imaging device; 110, substrate; 120, three-dimensional structure layer; 121, micro-nano structure unit; 130, spacer layer; 140, microlens array; 141, microlens; 150, recording plane; 160, reflective material layer.

DETAILED DESCRIPTION

In the following detailed description, numerous specific details are set forth by way of examples in order to provide a thorough understanding of the relevant disclosure. Obviously, drawings described below are only some examples or embodiments of the present disclosure. It should be understood that the purposes of these illustrated embodiments are only provided to those skilled in the art to practice the application, and not intended to limit the scope of the present disclosure.

The terminology used herein is for the purpose of describing particular example embodiments only and is not intended to be limiting. It will be understood that the term "mounted," "connected," "coupled," "fixed," and similar terms shall be construed broadly. For example, connections may be permanent or detachable; integrated as a single structure or mechanically/electrically linked; directly joined or indirectly coupled through an intermediary; referring to internal communication between two components or their interactive relationships, unless explicitly defined otherwise. Those skilled in the art may interpret these terms in context based on the specific circumstances.

The terms "first" and "second" are used only for descriptive purposes and are not to be construed as indicating or implying relative importance or implicitly specifying the number of technical features indicated. Thus, the feature defined as "first", "second" may expressly or implicitly include at least one such feature or implicitly include at least one such feature. In the description of the present specification, "plurality" means at least two, e.g., two, three, and the like, unless explicitly and specifically limited otherwise.

Unless otherwise defined, all technical and scientific terms used herein have the same meanings as are commonly understood by those skilled in the art to which this specification pertains. Terms used herein in the specification of this specification are used only for the purpose of describing specific embodiments and are not intended to be limiting. The term "and/or" as used herein encompasses any and all combinations of one or more of the relevant listed items.

FIG. 1 is a schematic diagram illustrating a structure of an exemplary 3D integrated imaging device according to some embodiments of the present disclosure. It should be noted that the dimensions in any drawing of the present disclosure are intended to be exemplary and illustrative only and shall not be construed as actual dimensions.

One of the embodiments of the present disclosure provides a 3D integrated imaging device. The 3D integrated imaging device is an optical principle-based stereoscopic display apparatus that reconstructs multi-view two-dimensional images into a three-dimensional light field with real spatial depth through collaborative operation between a microlens array and an image processing system, thereby achieving naked-eye stereoscopic visual effects.

In some embodiments, as shown in FIG. 1, a 3D integrated imaging device 100 may include a three-dimensional structure layer 120, a spacer layer 130, and a microlens array 140.

The spacer layer 130 refers to a layer disposed between the three-dimensional structure layer 120 and the microlens array 140 for controlling a depth of field. More descriptions regarding the depth of field may be found later in the present disclosure.

In some embodiments, the spacer layer 130 may have a preset thickness. The preset thickness may be set based on design experience, application requirements, desired depth-of-field effects, or the like. It is understood that, by controlling the thickness of the spacer layer 130, the distance between the vertex of the microlens array 140 and the three-dimensional structure layer 120 can be controlled, thereby controlling the depth of field of a reproduced image and achieving dynamic adjustment of the depth-of-field effect in the reproduced image. The reproduced image refers to a three-dimensional stereoscopic image of a target object reconstructed in space through optical interactions among structures of the 3D integrated imaging device. In some embodiments, the thickness of the spacer layer 130 correlates with the depth of field of the reproduced image. For example, the greater the thickness of the spacer layer 130, the smaller the depth of field of the reproduced image, and the smaller the thickness of the spacer layer 130, the larger the depth of field of the reproduced image.

In some embodiments, the preset thickness of the spacer layer 130 may be 1 micron (μm) to 200 microns. In some embodiments, the preset thickness of the spacer layer 130 may be 10 μm to 190 μm. In some embodiments, the preset thickness of the spacer layer 130 may be 20 μm to 180 μm. In some embodiments, the preset thickness of the spacer layer 130 may be 30 μm to 170 μm. In some embodiments, the preset thickness of the spacer layer 130 may be 40 μm to 160 μm. In some embodiments, the preset thickness of the spacer layer 130 may be 50 μm to 150 μm. In some embodiments, the preset thickness of the spacer layer 130 may be 60 μm to 140 μm. In some embodiments, the preset thickness of the spacer layer 130 may be 70 μm to 130 μm. In some embodiments, the preset thickness of the spacer layer 130 may be 80 μm to 120 μm. In some embodiments, the preset thickness of the spacer layer 130 may be 90 μm to 110 μm. By setting the preset thickness of the spacer layer 130 within a range of 1 μm to 200 μm, the thickness of the spacer layer 130 can be controlled within an appropriate range, thereby avoiding problems such as poor imaging effects caused by the thickness of the spacer layer 130 being too large or too small.

In some embodiments, the microlens array 140 may include a plurality of microlenses 141. In some embodiments, a sum of the thickness of the spacer layer 130 and a thickness of the microlens array 140 may be greater than a focal length of each microlens 141. It is understood that, as a plano-convex lens, the microlens 141 follows the convex lens imaging law, i.e., a clear image can only be formed when an object distance (distance from the object to the lens) is greater than the focal length; if the object distance is smaller than the focal length, the light rays diverge and cannot form an image. In some embodiments of the present disclosure, since the three-dimensional structure layer 120 is located below both the spacer layer 130 and the microlens array 140, light rays need to pass through at least the spacer layer 130 and the microlens array 140 during imaging (i.e., the object distance is greater than or equal to the sum of the thicknesses of the spacer layer 130 and microlens array 140). Therefore, the sum of the thickness of the spacer layer 130 and the thickness of the microlens array 140 needs to be greater than the focal length of a single microlens 141. In some embodiments, the thickness of the spacer layer 130 may be configured according to imaging requirements, so that the sum of the thickness of the spacer layer 130 and the microlens array 140 satisfies a preset condition relative to the focal length of a single microlens 141, thereby achieving desired display effects. In some embodiments, when the sum of the thickness of the spacer layer 130 and the thickness of a microlens 141 is greater than one focal length and is less than two focal lengths of the microlens 141, a virtual image is formed; when the sum is greater than two focal lengths, a real image is formed. By configuring the sum of the thicknesses of the spacer layer 130 and the microlens array 140 to be greater than the focal length of a single microlens 141, a reproduced image can be reliably presented, avoiding problems such as imaging failures caused by non-compliance with the convex lens imaging law regarding the relationship between the object distance and the focal length of the microlens 141.

In some embodiments, the spacer layer 130 may be made of a light-transmitting material. For example, the spacer layer 130 may be made of polyethylene terephthalate (PET), polymethyl methacrylate (PMMA), polycarbonate (PC), and other materials. In some embodiments, the material of the spacer layer 130 is the same as a material of the microlens array 140. It is understood that if the spacer layer 130 is made of a non-transparent material, light cannot pass through the spacer layer 130 to reach the three-dimensional structure layer 120, making imaging impossible. If the spacer layer 130 and the microlens array 140 are made of different materials, an abrupt change in refractive index may occur between the interfaces of the structure layers, leading to problems such as interfacial reflection loss and aberration distortion. By setting the spacer layer 130 to be made of a light-transmitting material, the material of the spacer layer 130 is the same as that of the microlens array 140, both normal imaging and imaging effect can be achieved.

The three-dimensional structure layer 120 refers to a functional layer carrying core optical information, which is configured to encode stereoscopic image data and cooperate with the microlens array 140 to reconstruct a three-dimensional image.

In some embodiments, the three-dimensional structure layer 120 may be disposed on a surface of a side of the spacer layer 130. In some embodiments, the three-dimensional structure layer 120 may include a plurality of micro-nano structure units 121. The micro-nano structure unit 121 refers to a functional structure unit with dimensions at micrometer and nanometer scales. It is understood that, each micro-nano structure unit 121 carries optical information of the target stereoscopic image in a specific observation direction, and the collective operation of the plurality of micronano structure units 121 enables integrated recording and reconstruction of the complete 3D image.

In some embodiments, the three-dimensional structure layer 120 may be formed on a surface of a side of a substrate 110. For example, techniques such as photolithography or transfer printing may be used on the surface of the substrate 110 to form three-dimensional concave-convex patterns (i.e., the micro-nano structure units 121). Coloring materials (e.g., ink) may be filled into the recesses to create a stereoscopic pattern with light-and-dark contrast. More descriptions regarding the substrate 110 may be found later in the present disclosure.

The microlens array 140 refers to an optical structure composed of a plurality of micron-scale lenses arranged in a specific pattern, which is configured to cooperate with the three-dimensional structure layer 120 and the spacer layer 130 to achieve a 3D visual effect.

In some embodiments, the microlens array 140 may be disposed on a surface of a side of the spacer layer 130 away from the three-dimensional structure layer 120. In some embodiments, the microlens array 140 may include a plurality of microlenses 141. The microlens 141 refers to a micron-scale miniature optical element. It is understood, each microlens 141 independently captures light field information in a specific observation direction, and the collective operation of the plurality of microlenses 141 achieves complete angular coverage and overall 3D image presentation. In some embodiments, the microlens 141 may be a planoconvex lens. The plano-convex lens refers to a monolithic optical lens having one planar surface and one convex spherical (or aspherical) surface.

In some embodiments, the microlens array 140 may include plano-convex lenses arranged in an array. In some embodiments, an aperture of the plano-convex lenses may be 10 µm to 250 µm. In some embodiments, the aperture of the plano-convex lenses may be 20 µm to 240 µm. In some embodiments, the aperture of the plano-convex lenses may be 30 µm to 230 µm. In some embodiments, the aperture of the plano-convex lenses may be 40 µm to 220 µm. In some embodiments, the aperture of the plano-convex lenses may be 50 µm to 210 µm. In some embodiments, the aperture of the plano-convex lenses may be 60 µm to 200 µm. In some embodiments, the aperture of the plano-convex lenses may be 70 µm to 190 µm. In some embodiments, the aperture of the plano-convex lenses may be 80 µm to 180 µm. In some embodiments, the aperture of the plano-convex lenses may be 90 µm to 170 µm. In some embodiments, the aperture of the plano-convex lenses may be 100 µm to 160 µm. In some embodiments, the aperture of the plano-convex lenses may be 110 µm to 150 µm. In some embodiments, the aperture of the plano-convex lenses may be 120 µm to 140 µm.

In some embodiments, the arrangement of the array includes an orthogonal arrangement or a honeycomb arrangement. In some embodiments, when the plano-convex lenses are arranged in the orthogonal arrangement, an arrangement period of each plano-convex lens in the X and Y directions is the same and is greater than or equal to the aperture of the plano-convex lens. The arrangement period refers to a minimum repeating interval distance of aligned units in a specific direction. It is understood that each plano-convex lens has the same arrangement period along the X and Y directions, i.e., the plano-convex lenses are arranged at equal intervals in a vertical direction to form a rectangular grid. The arrangement period is configured to be greater than or equal to the aperture of the plano-convex lens to avoid overlapping of the plurality of plano-convex lenses, thereby ensuring the independent optical function of each plano-convex lens. In some embodiments, when the plano-convex lenses are arranged in the honeycomb arrangement, the arrangement period of each plano-convex lens in the X and Y directions is different, i.e., the plano-convex lenses are arranged at non-equal intervals in the vertical direction. When the microlens array 140 is arranged in the honeycomb arrangement, the imaging is more delicate. By configuring the microlens array 140 to include the plano-convex lenses arranged in an array, and the arrangement of the array includes an orthogonal arrangement or a honeycomb arrangement, the microlens array 140 is defined as having regularly-arranged plano-convex lenses, thereby ensuring optimal imaging effects.

In some embodiments, the plurality of micro-nano structure units 121 correspond to the plurality of micro-lenses 141 one by one. It is understood that a single microlens 141 forms an independent optical channel that must correspond to a single micro-nano structure unit 121 in a one-to-one configuration to achieve precise optical path control. If there is no correspondence, this may lead to problems such as crosstalk in the optical path, resulting in imaging artifacts or ghosting, etc.

In some embodiments, a front view pattern of the plurality of micro-nano structure units 121 is a superposition of images formed by each layered image of a target stereoscopic image under the plurality of micro-lenses 141 according to different depths of field after the target stereoscopic image is layered. The target stereoscopic image refers to a stereoscopic image desired to be presented. The front view pattern refers to a planar image obtained when viewing the plurality of micro-nano structure units 121 frontally. It is understood that the front-view pattern is a superposition of images formed by planar images under the micro-lenses 141 according to different depths of field, the planar images are obtained by layering the target stereoscopic image according to the depth of field. This superposition enables the microlens array 140 to reconstruct the stereoscopic image with authentic depth perception. The coordinated interaction between the microlens array 140 and the three-dimensional structure layer 120 produces a stereoscopic display effect. Under the action of light, an observer located at a viewing location (on a side of the microlens array 140 away from the spacer layer 130) may observe a 3D reproduced image of a pattern in the three-dimensional structure layer 120 after passing through the microlens array 140.

In some embodiments, a relationship between pixel coordinates of each layered image of the target stereoscopic image under the single microlens 141 in a three-dimensional coordinate system (a spatial reference coordinate system formed by three mutually perpendicular axes, e.g., a Cartesian coordinate system, etc., where the axes are typically labeled as the X-axis, Y-axis, and Z-axis) and pixel coordinates within the micro-nano structure unit 121 corresponding to the microlens 141 may be expressed as follows:

$$X = X0 + \tan\left(\sin^{-1}\left(\sin\left(\tan^{-1}\left(\frac{x-x0}{g}\right)\right) * n\right)\right) * d,$$

$$Y = Y0 + \tan\left(\sin^{-1}\left(\sin\left(\tan^{-1}\left(\frac{y-y0}{g}\right)\right) * n\right)\right) * d,$$

where (X, Y) refers to the pixel coordinates of the layered image of the target stereoscopic image in the three-dimensional coordinate system, (X0, Y0) refers to a central coordinate of the microlens 141, (x, y) refers to coordinates of pixel points on the micro-nano structure unit 121 corresponding to the microlens 141, (x0, y0) refers to a central coordinate of the micro-nano structure unit 121, n is a refractive index of the microlens 141, g is a sum of a thickness of the spacer layer and a height of the microlens 141 in the microlens array 140, and d is the depth of field, that is, a distance from a plane where the layered image is located to a vertex of the microlens 141.

By configuring the 3D integrated imaging device 100 to include a spacer layer 130 with the preset thickness, a flexible depth of field control can be realized, enabling the device to adjust the depth-of-field effect of the reproduced image as needed to meet the requirements of different application scenarios. By configuring the 3D integrated imaging device 100 to include a three-dimensional structure layer 120 disposed the surface of the side of the spacer layer 130 and the three-dimensional structure layer 120 to include the plurality of micro-nano structure units 121, target image information can be recorded, which cooperates with the microlenses 141 to enable three-dimensional image presentation. By configuring the 3D integrated imaging device 100 to include a microlens array 140 arranged on the surface of the side of the spacer layer 130 away from the three-dimensional structure layer 120 and the microlens array 140 to include the plurality of microlenses 141, the microlens array 140 can cooperate with the three-dimensional structure layer 120 to achieve multi-view image information, ensuring that the reproduced image maintains optimal stereoscopic perception and depth hierarchy across different viewing angles. The plurality of micro-nano structure units 121 correspond to the plurality of microlenses 141 one by one, and the front view pattern of the plurality of micro-nano structure units 121 is formed by each layered image of the target stereoscopic image under the plurality of microlenses 141 according to different depths of field after the target stereoscopic image is layered. This configuration enables the microlens array 140 and the three-dimensional structure layer 120 to cooperate with each other, based on the binocular parallax principle of human vision, allowing observers to perceive 3D images with naked eyes without wearing special glasses, thereby enhancing user experience and viewing convenience. A formula expresses the relationship between pixel coordinates of each layered image of the target stereoscopic image under the single microlens 141 in a three-dimensional coordinate system and pixel coordinates within the micro-nano structure unit 121 corresponding to the microlens 141, enabling accurate and efficient acquisition of pixel coordinates in the three-dimensional coordinate system and corresponding pixel coordinates in the three-dimensional structure layer 120, thereby achieving overall 3D image effect modulation. In summary, the 3D integrated imaging device 100 provided in the present disclosure can effectively enhance 3D display performance, achieve flexible depth of field control, and maintain a compact structure with high feasibility, demonstrating broad application prospects.

Figure 2:
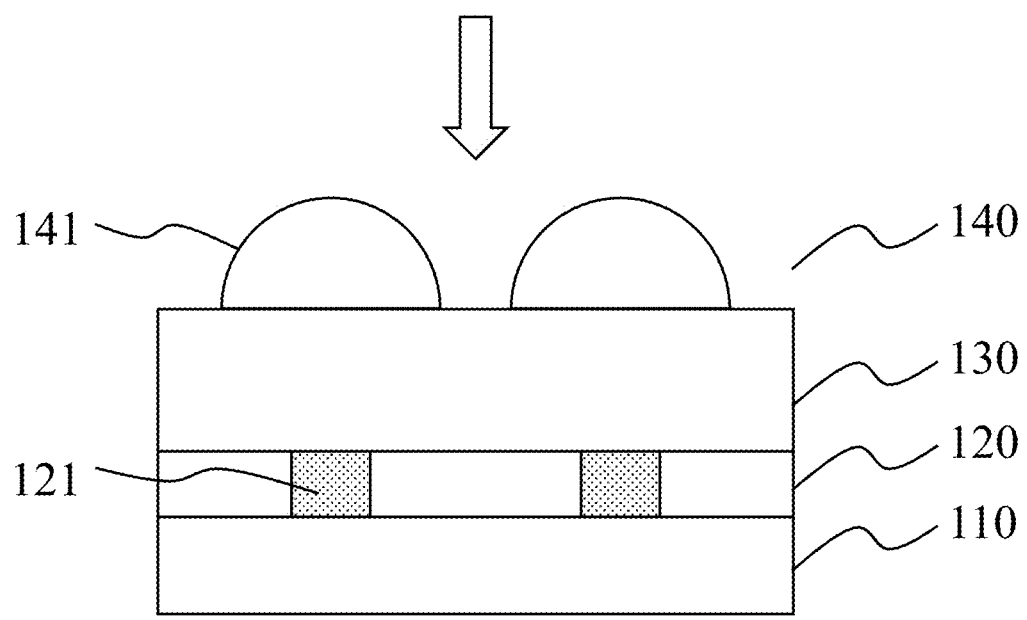
FIG. 2 is a schematic diagram illustrating a structure of an exemplary 3D integrated imaging device according to some embodiments of the present disclosure.
Figure 3:
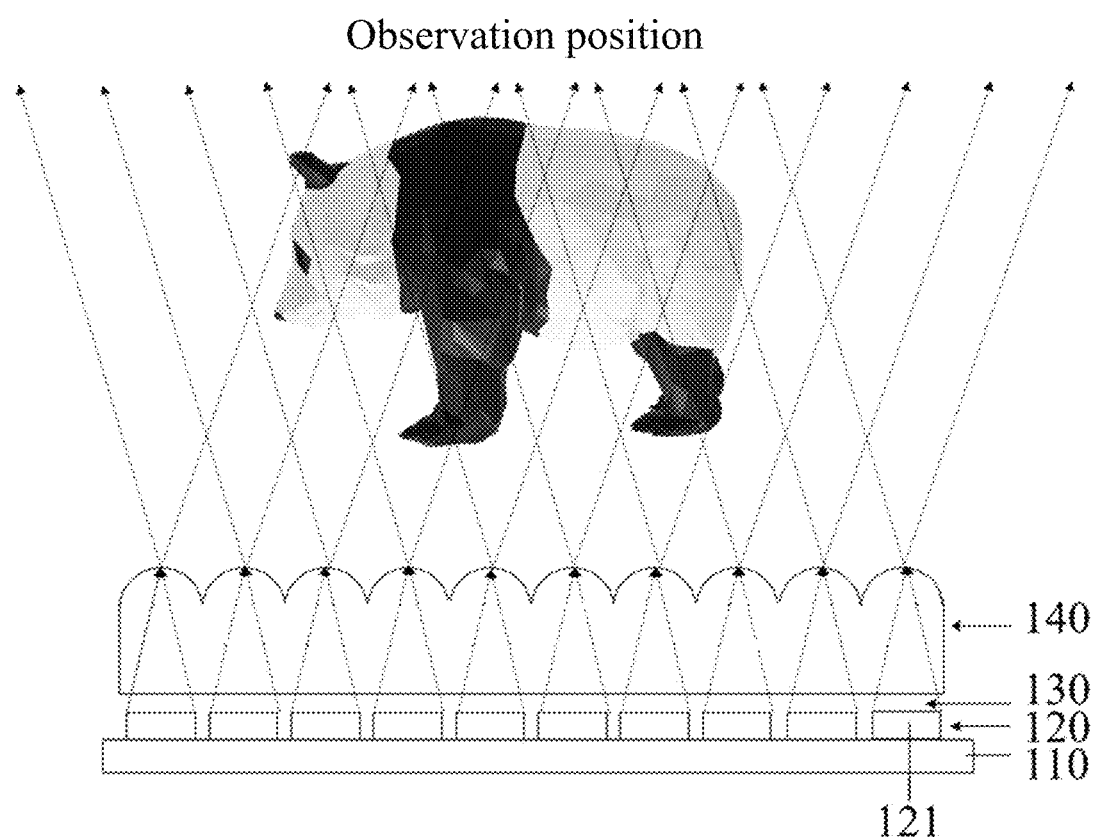
FIG. 3 is a schematic diagram illustrating imaging by the 3D integrated imaging device in FIG. 2 according to some embodiments of the present disclosure.
Figure 4:
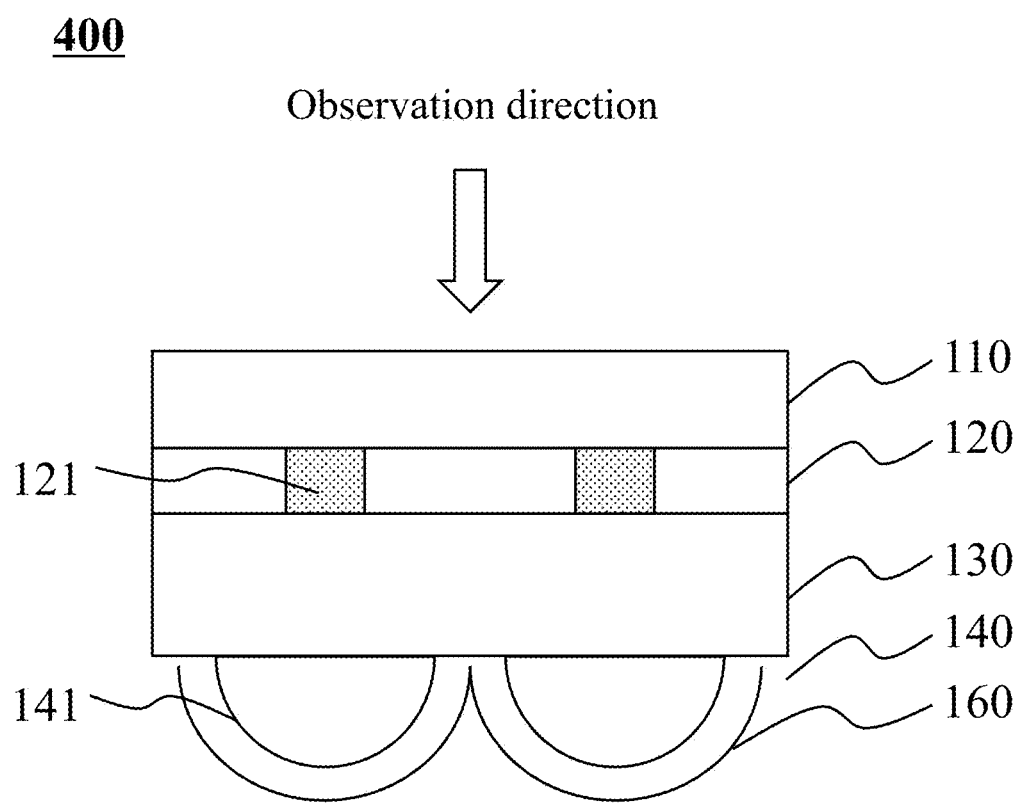
FIG. 4 is a schematic diagram illustrating a structure of an exemplary 3D integrated imaging device according to some embodiments of the present disclosure.

FIG. 2 is a schematic diagram illustrating a structure of an exemplary 3D integrated imaging device according to some embodiments of the present disclosure. FIG. 3 is a schematic diagram illustrating imaging by the 3D integrated imaging device in FIG. 2 according to some embodiments of the present disclosure. FIG. 4 is a schematic diagram illustrating a structure of an exemplary 3D integrated imaging device according to some embodiments of the present disclosure. As shown in FIGS. 2-4, the 3D integrated imaging device 100 may further include a substrate 110. The substrate 110 refers to a base material to which the three-dimensional structure layer 120 is attached, and serves as a supporting material for carrying the three-dimensional structure layer 120, ensuring stability and structural integrity of the entire device. In some embodiments, the substrate 110 may be provided on a side surface of the three-dimensional structure layer 120 away from the spacer layer 130.

In some embodiments, the 3D integrated imaging device 100 may be a transmissive or a reflective imaging device. In some embodiments, when the 3D integrated imaging device 100 is a transmissive imaging device, the substrate 110 may be formed from light-transmissive materials, such as UV-curable adhesives, polyethylene terephthalate (PET), polymethyl methacrylate (PMMA), or polycarbonate (PC), etc. It is understood that the transmissive 3D integrated imaging device 100 allows light to penetrate throughout the device, enabling observers to observe a stereoscopic reproduced image from either side of the device (e.g., the substrate 110 side or the microlens array 140 side) (only the viewing position at the microlens array 140 side is illustrated in the figures), realizing transmissive 3D effect.

In some embodiments, as shown in FIG. 4, when the 3D integrated imaging device 100 is a reflective imaging device, the substrate 110 may be formed from opaque materials, such as metallic materials (e.g., stainless steel, etc.), composite materials (e.g., carbon fiber reinforced polymers, etc.), etc.

In some embodiments, when the 3D integrated imaging device 100 is a reflective imaging device, a reflective material layer 160 may be provided on the side of the microlens array 140 away from the spacer layer 130. The reflective material layer 160 refers to a structural layer composed of a material possessing better reflectivity for working in concert with the substrate 110 to form a complete reflective imaging optical path. In some embodiments, the reflective material layer 160 may be made of one or more materials such as a metallic material, an inorganic nonmetallic material, or the like. It is understood that the reflective 3D integrated imaging device is capable of utilizing the reflective material layer 160 to reflect light back to the observer so that the observer can observe a stereoscopic reproduced image on a specific side (the side of the substrate 110), realizing a reflective 3D effect.

Figure 5A:
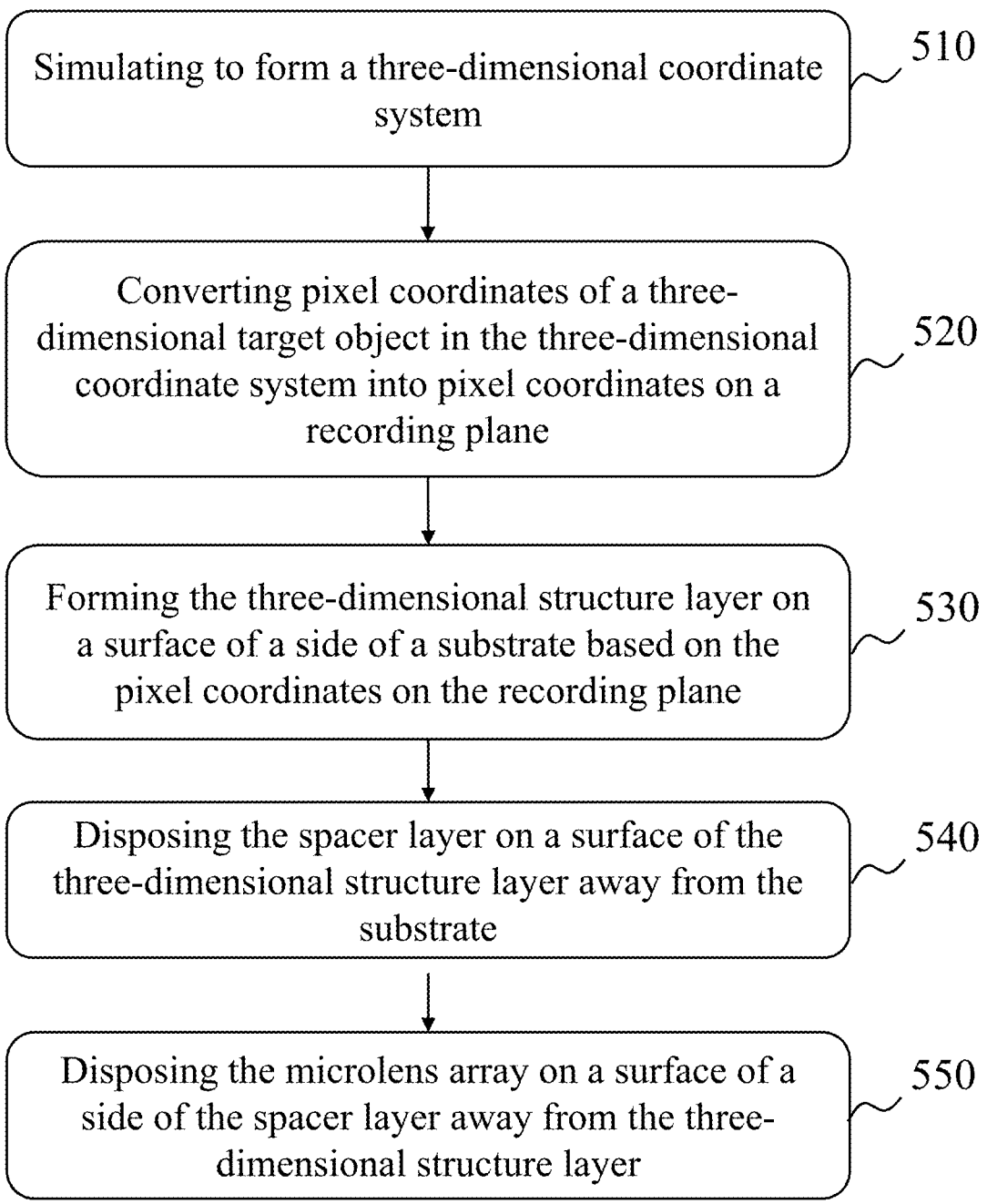
FIG. 5A is a flowchart illustrating an exemplary preparation process for a 3D integrated imaging device according to some embodiments of the present disclosure.

FIG. 5A is a flowchart illustrating an exemplary preparation process for a 3D integrated imaging device according to some embodiments of the present disclosure. The preparation process may be configured to prepare the 3D integrated imaging device of some embodiments of the present disclosure (e.g., the 3D integrated imaging device of FIGS. 1-2 and FIG. 4). As shown in FIG. 5A, process 500 includes the following steps.

In 510, a three-dimensional coordinate system may be formed by simulation.

In some embodiments, the three-dimensional coordinate system in space may be computer-simulated based on parameters of the microlens array 140 (e.g., the thickness of the microlens array 140, the focal length of each microlens 141, etc.) for subsequently determining position information of the three-dimensional target object. More descriptions regarding the three-dimensional coordinate system may be found in FIGS. 1-4 and related descriptions thereof.

In 520, pixel coordinates of a three-dimensional target object in the three-dimensional coordinate system may be converted into pixel coordinates on a recording plane.

The three-dimensional target object refers to an object for which an image needs to be reproduced in practical applications. The recording plane 150 refers to a plane configured to record image information. It is understood that the recording plane 150 may be regarded as a plane in which the front-view pattern of the three-dimensional structure layer 120 is located. In some embodiments, when the three-dimensional coordinate system is simulated, pixel coordinates of the three-dimensional target object in the three-dimensional coordinate system may be determined. Then the pixel coordinates of the three-dimensional target object may be converted into pixel coordinates on the recording plane 150. In some embodiments, black and white dot matrix data may be formed on the recording plane 150, wherein white dots indicate the presence of pixel data at corresponding positions on the recording plane 150 after the pixel coordinates of the three-dimensional target object are converted, and black dots indicate that absence of pixel data at corresponding positions on the recording plane 150 after the pixel coordinates of the three-dimensional target object are converted.

In some embodiments, the following formula may be used to perform the conversion of the pixel coordinates of the three-dimensional target object in the three-dimensional coordinate system under the single microlens 141 to the pixel coordinates on the corresponding recording plane 150:

$$X = X0 + \tan\left(\sin^{-1}\left(\sin\left(\tan^{-1}\left(\frac{x-x0}{g}\right)\right)*n\right)\right)*d,$$

$$Y = Y0 + \tan\left(\sin^{-1}\left(\sin\left(\tan^{-1}\left(\frac{y-y0}{g}\right)\right)*n\right)\right)*d,$$

where (X, Y) refers to the pixel coordinates of the three-dimensional coordinate system, (X0, Y0) refers to a central coordinate of the microlens 141, n is a refractive index of the microlens 141, g refers to a distance from the recording plane 150 to a vertex of the microlens 141, d refers to the depth of field, that is, a distance from a plane where the three-dimensional target object is located to a vertex of the microlens 141, (x, y) refers to coordinates of pixel points on the recording plane 150, (x0, y0) refers to a central coordinate of the micro-nano structure unit 121 corresponding to the microlens 141 on the recording plane 150.

Figure 6:
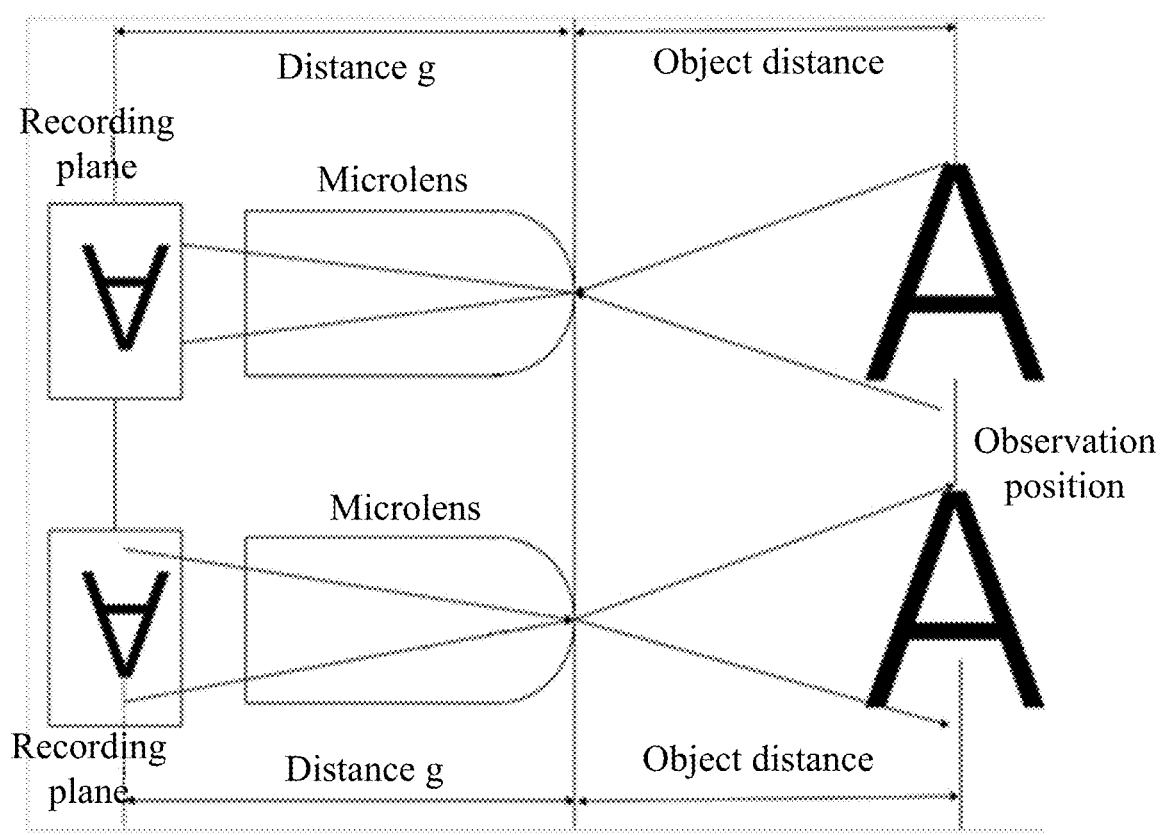
FIG. 6 is a schematic diagram illustrating a recorded image and a reproduced image of a single microlens according to some embodiments of the present disclosure.
Figure 7:
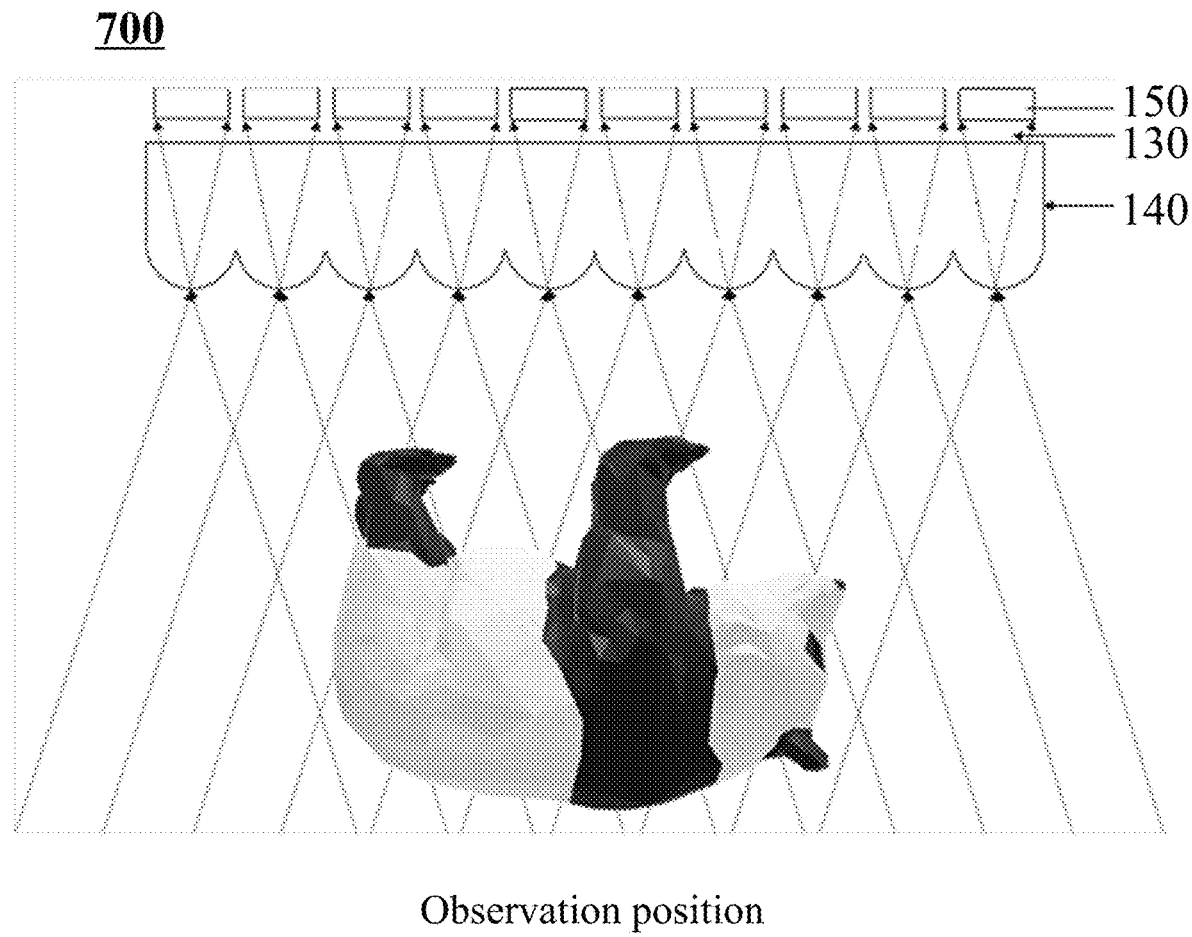
FIG. 7 is a schematic diagram illustrating imaging by a 3D integrated imaging device according to some embodiments of the present disclosure.

FIG. 6 is a schematic diagram illustrating a recorded image and a reproduced image of a single microlens according to some embodiments of the present disclosure. FIG. 7 is a schematic diagram illustrating imaging by a 3D integrated imaging device according to some embodiments of the present disclosure. As shown in FIGS. 6-7, a single microlens may record an object image located on a plane at a specified distance from the convex side of the microlens onto the recording plane at a designated distance from the lens plane side. Since the recording range of a single microlens is limited, the microlens array 140 formed by combining a plurality of microlenses enables the recording of large-sized three-dimensional target objects over a wide range.

Figure 5B:
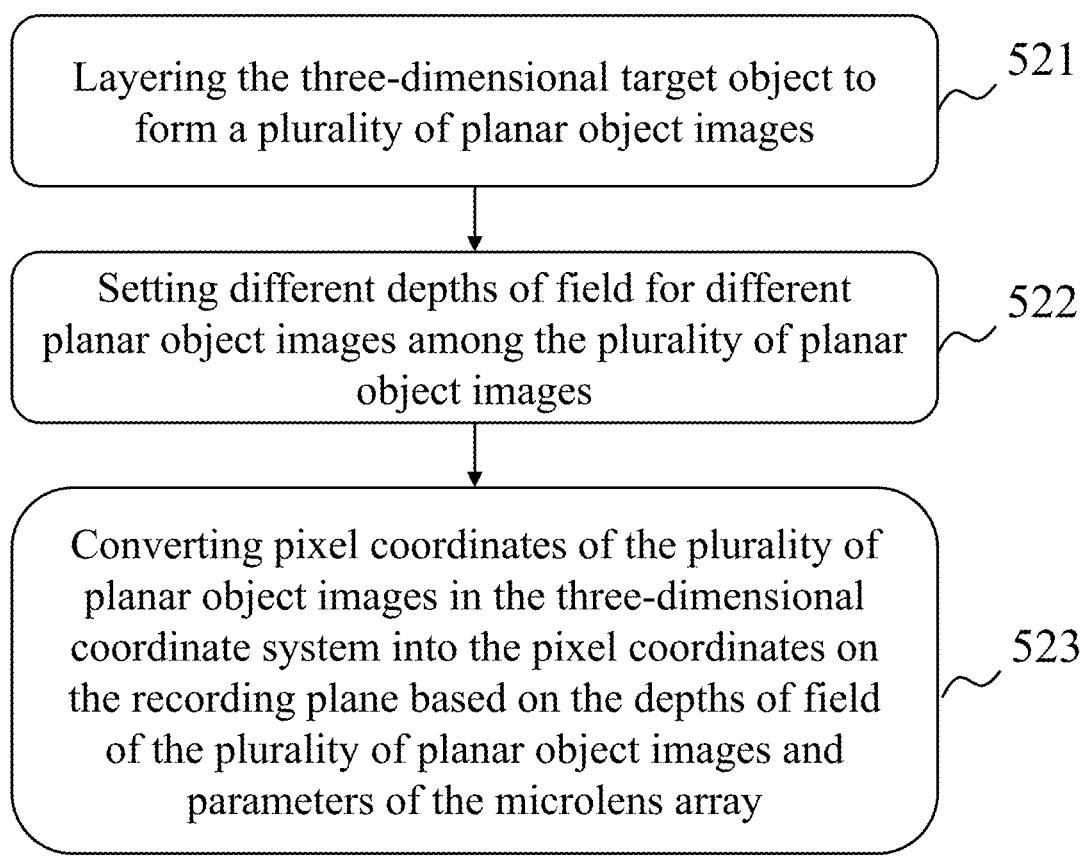
FIG. 5B is a flowchart illustrating an exemplary process for converting pixel coordinates according to some embodiments of the present disclosure.

FIG. 5B is a flowchart illustrating an exemplary process for converting pixel coordinates according to some embodiments of the present disclosure. As shown in FIG. 5B, process 500 may further include the following steps.

In 521, a plurality of planar object images may be formed by layering the three-dimensional target object.

In some embodiments, the three-dimensional target object may be layered based on a preset layer thickness to form a finite count of planar object images with continuously varying depths of field. The preset layer thickness may be set based on experience or requirements.

Figure 8:
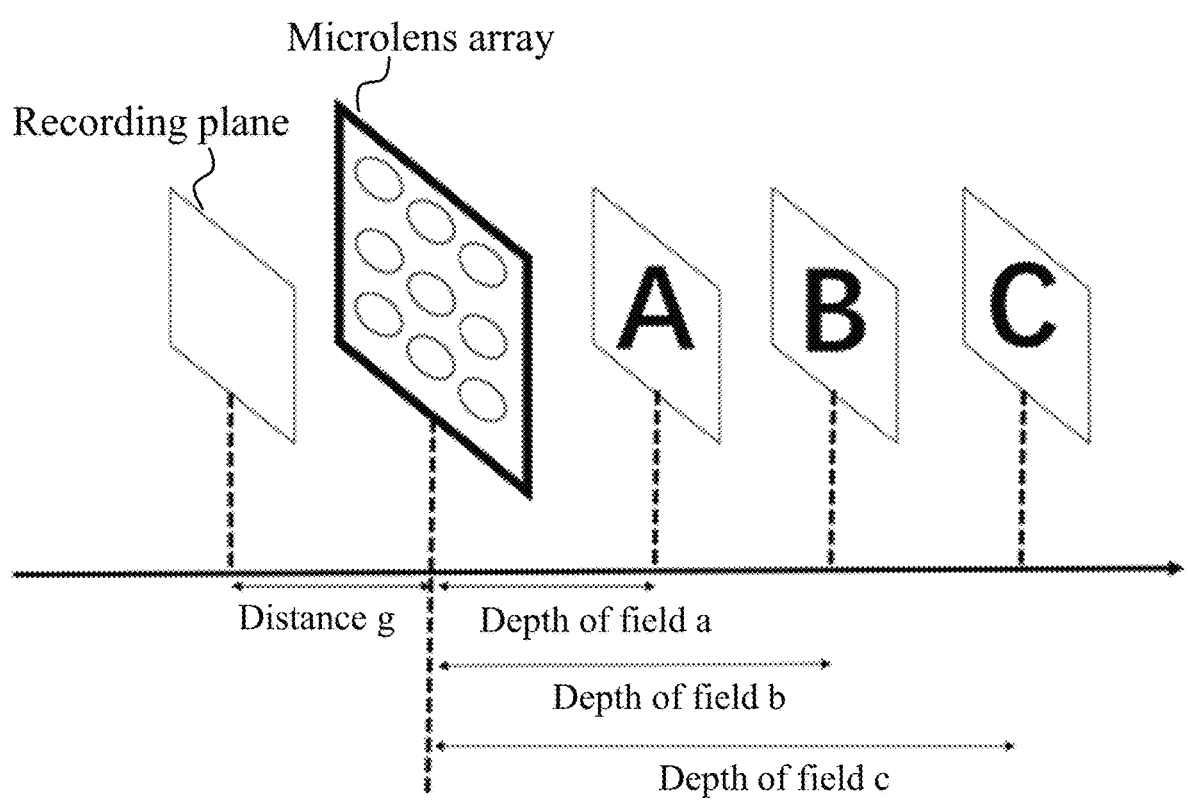
FIG. 8 is a schematic diagram illustrating recording an image of an object through a microlens array according to some embodiments of the present disclosure.

In 522, different depths of field may be set for different planar object images among the plurality of planar object images. FIG. 8 is a schematic diagram illustrating recording an object image based on a microlens array according to some embodiments of the present disclosure. As shown in FIG. 8, different depths of field (depth of field a–depth of field c) may be set for different planar object images among the plurality of planar object images.

In some embodiments, a corresponding depth of field may be assigned to each planar object image based on preset conditions. The preset conditions may be determined by experience or requirements. For example, a preset condition may be: given a preset layer thickness of b, the depth of field for the planar object image closest to the microlens array is set to a, the depth of field for the second closest planar object image is set to a+b, the depth of field for the third closest planar object image is set to a+2b, and so on.

In some embodiments, when different depths of field corresponding to different planar objects are set, reference values of the depths of field may be calculated, the reference values being expressed by:

$$d_0 = \frac{P_1}{P_p}kf = knf,$$

where $d_0$ refers to the reference values of the depths of field of the reproduced images corresponding to the planar object images, $P_1$ refers to a period between the plurality of microlenses 141 corresponding to the planar object images, f refers to a focal length of the plurality of microlenses 141 corresponding to the planar object images, $P_p$ refers to a resolution of pixel points on the recording plane 150 corresponding to the planar object images, and n refers to a number of pixels in the plurality of microlenses 141, k refers to a constant. By calculating the reference values of the depth of field for the planar object images, factors such as microlens parameters and pixel data can be comprehensively considered to determine a more accurate and reasonable depth of field for the planar object images, thereby avoiding errors caused by experience and other settings.

In 523, the pixel coordinates of the plurality of planar object images in the three-dimensional coordinate system may be converted into pixel coordinates on the recording plane 150 based on the depths of field of the plurality of planar object images and parameters of the microlens array 140.

In some embodiments, after determining the plurality of planar object images with different depths of field, the pixel coordinates of the plurality of planar object images in the three-dimensional coordinate system may be converted into pixel coordinates on the recording plane 150 based on the depths of field of the plurality of planar object images and parameters of the microlens array 140. For example, starting from the planar object image with the largest depth of field, the corresponding planar object images may be sequentially converted to pixel data on the recording plane 150. When data conflicts occur at the same recording positions on the recording plane 150, the pixel data from the planar object image with a greater depth of field may be overwritten by the pixel data corresponding to the planar object image with a smaller depth of field.

In some embodiments, after operation 523, the pixel coordinates on the recording plane 150 may be adjusted by a following mapping relationship:

$$\begin{pmatrix} i' \\ j' \\ s' \\ t' \end{pmatrix} = \begin{pmatrix} 1 & 0 & -k & 0 \\ 0 & 1 & 0 & -k \\ 0 & 0 & -1 & 0 \\ 0 & 0 & 0 & -1 \end{pmatrix} \begin{pmatrix} i \\ j \\ s \\ t \end{pmatrix} + \begin{pmatrix} kn \\ kn \\ n+1 \\ n+1 \end{pmatrix},$$

where $$\begin{pmatrix} i' \\ j' \\ s' \\ t' \end{pmatrix}$$

refers to coordinates, after adjustment, of the (s', t')th pixel point in the recording plane 150 corresponding to the (i', j')th microlens, $$\begin{pmatrix} i \\ j \\ s \\ t \end{pmatrix}$$

refers to coordinates, before adjustment, of the (s, t)th pixel point in the recording plane 150 corresponding to the (i, j)th microlens, k refers to a constant, and n refers to a number of pixels corresponding to a single microlens.

A mapping relationship between the initial pixel coordinates on the recording plane 150 under the microlens array 140 and the adjusted pixel coordinates may be established by the k value. For different values of k, the adjusted pixel coordinates change. The above mapping relationship can be derived from the ray tracing algorithm. For different values of k, the adjusted pixel coordinates will change. The aforementioned mapping relationship may be derived through a ray-tracing algorithm.

According to the above relationship matrix, the coordinates of the (s, t)th pixel point corresponding to the (i, j)th microlens on the recording plane 150 may be mapped to the adjusted coordinates of the (s', t')th pixel point corresponding to the (i', j')th microlens on the recording plane 150, thereby adjusting the coordinates of each pixel on the recording plane 150, and changing the relative position between the microlens array 140 and the reproduced image at a final display, thereby realizing a transition of the depth of field of the reproduced image from a real image to a virtual image.

In 530, a three-dimensional structural layer 120 may be formed on one side surface of the substrate 110 based on the pixel coordinates on the recording plane 150. More descriptions regarding the substrate 110 and the three-dimensional structural layer 120 may be found in FIGS. 1-4 and related descriptions thereof.

In some embodiments, after determining the pixel coordinates on the recording plane 150, the pixel coordinates on the recording plane 150 may be transferred to the surface of the substrate 110 in a preset manner to form the three-dimensional structure layer 120. The preset manner is set based on experience or requirements. For example, the preset manner may include photolithography, transfer printing, or the like. In some embodiments, the preset manner enables formation of three-dimensional patterns on the surface of the substrate 110 that correspond to the pixel coordinates on the recording plane 150, followed by filling the three-dimensional patterns with ink to provide light-dark contrast, thereby forming the three-dimensional structure layer 120.

In some embodiments, the operation 530 may further include forming the plurality of micro-nano structure units 121 on the surface of the side of the substrate based on the pixel coordinates on the recording plane 150; and filling the surface of the side of the substrate with a coloring material.

In some embodiments, the three-dimensional patterns corresponding to the pixel coordinates on the recording plane 150, i.e., the plurality of micro-nano structure units 121, may be formed on the surface of the substrate via photolithography, transfer printing, or similar techniques, followed by filling the three-dimensional patterns with coloring materials such as ink. By forming the plurality of micro-nano structure units 121 and filling the surface of the substrate 110 with the plurality of micro-nano structure units 121 with a coloring material, the micro-nano structure units 121 are imparted with light-dark contrast, thereby enabling effective recording of image information. More descriptions regarding the plurality of micro-nano structure units 121 may be found in FIGS. 1-4 and related descriptions thereof.

In some embodiments, after the operation 530, the substrate 110 may be peeled off. It is understood that the substrate is configured to carry the three-dimensional structure layer 120, and since it is not integrally integrated with the three-dimensional structure layer 120, after the three-dimensional structure layer 120 has been constructed, the substrate may be peeled off to achieve a better imaging effect. In some embodiments, the operation of peeling off the substrate 110 may be performed after the operation 530 and before the operation 540, or performed after the operation 540 and before the operation 550, or performed after the operation 550, and it is not limited to the present disclosure.

In 540, the spacer layer 130 may be disposed on a surface of the three-dimensional structure layer 120 away from the substrate 110.

In some embodiments, after forming the three-dimensional structure layer 120, a spacer layer having a preset thickness may be provided on the surface of the three-dimensional structure layer 120. More descriptions regarding the spacer layer and the preset thickness may be found in FIGS. 1-4 and related descriptions thereof.

In 550, the microlens array 140 may be disposed on a surface of a side of the spacer layer 130 away from the three-dimensional structure layer 120.

In some embodiments, the microlens array 140 may be disposed on the surface of the spacer layer 130. Under the action of light, the target stereoscopic image corresponding to the three-dimensional target object can be reproduced within a specified distance range from the 3D integrated imaging device. More descriptions regarding the microlens array 140 and the three-dimensional target object may be found in FIGS. 1-4 and related descriptions thereof.

In some embodiments, after the operation 530, a reflective material layer 160 is provided on a side of the microlens array 140 away from the spacer layer 130. A reflective 3D effect can thus be presented. More descriptions regarding the reflective material layer 160 may be found in FIGS. 1-4 and related descriptions thereof.

By simulating to form the three-dimensional coordinate system, converting pixel coordinates of the three-dimensional target object in the three-dimensional coordinate system into pixel coordinates on the recording plane 150, and forming the three-dimensional structure layer 120 on the surface of the side of the substrate based on the pixel coordinates on the recording plane 150, the stereoscopic pattern corresponding to the formed three-dimensional structure layer 120 can be made accurate, reliable, and have light-dark contrast; the spacer layer 130 and the microlens array 140 are sequentially disposed on the three-dimensional structure layer 120, and through the coordination of the three-dimensional structure layer 120 and the microlens array 140, a 3D image can be observed at the corresponding observation position. By controlling the thickness of the spacer layer 130, the distance between the vertex of the microlens array 140 and the three-dimensional structure layer 120 can be adjusted, thereby enabling control of the depth of field in the reproduced image, which has the function of adjusting the depth of field effect of the reproduced image.

It should be understood that, although the steps in the flowcharts of the above embodiments are displayed in sequence according to the arrows, these steps are not necessarily executed in the order indicated by the arrows. Unless otherwise specified in this document, there is no strict order restriction on the execution of these steps, and these steps can be executed in other orders. Moreover, at least a part of the steps in the flowcharts of the above embodiments may include multiple steps or multiple stages, and these steps or stages are not necessarily executed at the same time, but can be executed at different times. The execution order of these steps or stages is not necessarily sequential, but can be executed in turn or alternately with other steps or at least a part of the steps or stages in other steps.

The technical features of the above embodiments can be combined arbitrarily. In order to make the description concise, all possible combinations of the technical features in the above embodiments are not described. However, as long as there is no contradiction in the combination of these technical features, they should be considered to be within the scope of this specification.

The above embodiments only express several implementation methods of this specification, and the description is relatively specific and detailed, but it cannot be understood as a limitation on the scope of the patent. It should be noted that, for those skilled in the art, several modifications and improvements can be made without departing from the concept of this specification, and these are all within the scope of protection of this specification. Therefore, the scope of protection of this specification shall be subject to the attached claims.

What is claimed is:

1. A 3D integrated imaging device, comprising:
   a spacer layer having a preset thickness;
   a three-dimensional structure layer disposed on a surface of a side of the spacer layer, the three-dimensional structure layer including a plurality of micro-nano structure units; and
   a microlens array arranged on a surface of a side of the spacer layer away from the three-dimensional structure layer, the microlens array including a plurality of microlenses,
   wherein
   the plurality of micro-nano structure units correspond to the plurality of microlenses one by one,
   a front view pattern of the plurality of micro-nano structure units is a superposition of images formed by each layered image of a target stereoscopic image under the plurality of microlenses according to different depths of field after the target stereoscopic image is layered, and
   a relationship between pixel coordinates of each layered image of the target stereoscopic image under a single microlens in a three-dimensional coordinate system and pixel coordinates in the three-dimensional structure layer is:

$$X = X0 + \tan\left(\sin^{-1}\left(\sin\left(\tan^{-1}\left(\frac{x-x0}{g}\right)\right)*n\right)\right)*d$$

$$Y = Y0 + \tan\left(\sin^{-1}\left(\sin\left(\tan^{-1}\left(\frac{y-y0}{g}\right)\right)*n\right)\right)*d$$

where (X, Y) refers to the pixel coordinates of the layered image of the target stereoscopic image in the three-dimensional coordinate system, (X0, Y0) refers to a central coordinate of the microlens, (x, y) refers to coordinates of pixel points on a micro-nano structure unit corresponding to the microlens, (x0, y0) refers to a central coordinate of the micro-nano structure unit, n is a refractive index of the microlens, g is a sum of a thickness of the spacer layer and a height of the microlens, and d is a depth of field, that is, a distance from a plane where the layered image is located to a vertex of the microlens.

2. The 3D integrated imaging device of claim 1, wherein the spacer layer is made of a light-transmitting material, and the material of the spacer layer is the same as a material of the microlens array.

3. The 3D integrated imaging device of claim 1, wherein a reflective material layer is provided on a side of the microlens array away from the spacer layer.

4. The 3D integrated imaging device of claim 1, wherein a sum of the thickness of the spacer layer and a thickness of the microlens array is greater than a focal length of each microlens.

5. The 3D integrated imaging device of claim 1, wherein the preset thickness is 1 micron to 200 microns.

6. The 3D integrated imaging device of claim 1, wherein the microlens array comprises plano-convex lenses arranged in an array, and the arrangement of the array comprises an orthogonal arrangement or a honeycomb arrangement.

7. A preparation method for a 3D integrated imaging device, wherein:
the 3D integrated imaging device comprises:
a spacer layer having a preset thickness;
a three-dimensional structure layer is disposed on a surface of a side of the spacer layer, the three-dimensional structure layer including a plurality of micro-nano structure units; and
a microlens array arranged on a surface of a side of the spacer layer away from the three-dimensional structure layer, the microlens array including a plurality of microlenses,
wherein
the plurality of micro-nano structure units correspond to the plurality of micro-lenses one by one, and
a front view pattern of the plurality of micro-nano structure units is a superposition of images formed by each layered image of a target stereoscopic image under the plurality of micro-lenses according to different depths of field after the target stereoscopic image is layered,
the preparation method comprises:
simulating to form a three-dimensional coordinate system;
converting pixel coordinates of a three-dimensional target object in the three-dimensional coordinate system into pixel coordinates on a recording plane;
forming the three-dimensional structure layer on a surface of a side of a substrate based on the pixel coordinates on the recording plane;
disposing the spacer layer on a surface of the three-dimensional structure layer away from the substrate; and
disposing the microlens array on a surface of a side of the spacer layer away from the three-dimensional structure layer.

8. The preparation method of claim 7, wherein the converting pixel coordinates of a three-dimensional target object in the three-dimensional coordinate system into pixel coordinates on a recording plane comprises:
layering the three-dimensional target object to form a plurality of planar object images;
setting different depths of field for different planar object images among the plurality of planar object images; and
converting pixel coordinates of the plurality of planar object images in the three-dimensional coordinate system into the pixel coordinates on the recording plane based on the depths of field of the plurality of planar object images and parameters of the microlens array.

9. The preparation method of claim 8, wherein the setting different depths of field for different plane images among the plurality of plane images comprises:

calculating reference values of the depths of field, the reference values being expressed by:

$$d_0 = \frac{P_1}{P_p} kf = knf$$

where $d_0$ refers to the reference values, $P_1$ refers to a period between the plurality of microlenses, f refers to a focal length of the plurality of microlenses, $P_p$ refers to a resolution of pixel points on the recording plane, and n refers to a number of pixels in the plurality of microlenses;

after the converting pixel coordinates of a three-dimensional target object in the three-dimensional coordinate system into pixel coordinates on a recording plane, the preparation method further includes:
adjusting the pixel coordinates on the recording plane by a following mapping relationship:

$$\begin{pmatrix} i' \\ j' \\ s' \\ t' \end{pmatrix} = \begin{pmatrix} 1 & 0 & -k & 0 \\ 0 & 1 & 0 & -k \\ 0 & 0 & -1 & 0 \\ 0 & 0 & 0 & -1 \end{pmatrix} \begin{pmatrix} i \\ j \\ s \\ t \end{pmatrix} + \begin{pmatrix} kn \\ kn \\ n+1 \\ n+1 \end{pmatrix}$$

where $$\begin{pmatrix} i' \\ j' \\ s' \\ t' \end{pmatrix}$$

refers to coordinates, after adjustment, of (s', t')th pixel point in the recording plane corresponding to (s', j')th microlens, $$\begin{pmatrix} i \\ j \\ s \\ t \end{pmatrix}$$

refers to coordinates, before adjustment, of (s, t)th pixel point in the recording plane corresponding to (i, j)th microlens, k refers to a constant, and n refers to a number of pixels corresponding to a single microlens.

10. The preparation method of claim 7, wherein the forming the three-dimensional structure layer on a surface of a side of a substrate based on the pixel coordinates on the recording plane comprises:
forming the plurality of micro-nano structure units on the surface of the side of the substrate based on the pixel coordinates on the recording plane; and
filling the surface of the side of the substrate with a coloring material.

11. The preparation method of claim 7, wherein after the forming the three-dimensional structure layer on a surface of a side of a substrate based on the pixel coordinates on the recording plane, the preparation method further comprises peeling off the substrate.

* * * * *